US010189182B2

(12) United States Patent
Takekawa et al.

(10) Patent No.: US 10,189,182 B2
(45) Date of Patent: Jan. 29, 2019

(54) PROCESSING SYSTEM

(71) Applicant: DISCO CORPORATION, Tokyo (JP)

(72) Inventors: Masahiro Takekawa, Tokyo (JP);
Tatsuhiko Mori, Tokyo (JP); Hirotaka Ochiai, Tokyo (JP); Frank Wei, Tokyo (JP)

(73) Assignee: DISCO Corporation, Tokyo (JP)

( * ) Notice: Subject to any disclaimer, the term of this patent is extended or adjusted under 35 U.S.C. 154(b) by 73 days.

(21) Appl. No.: 15/163,892

(22) Filed: May 25, 2016

(65) Prior Publication Data
US 2016/0346956 A1 Dec. 1, 2016

(30) Foreign Application Priority Data
May 26, 2015 (JP) ................. 2015-106801

(51) Int. Cl.
| B28D 7/00 | (2006.01) |
| B28D 5/02 | (2006.01) |
| B23Q 17/09 | (2006.01) |
| B23Q 17/24 | (2006.01) |
| B23Q 17/10 | (2006.01) |
| B23Q 17/20 | (2006.01) |

(52) U.S. Cl.
CPC ......... *B28D 7/005* (2013.01); *B23Q 17/0961* (2013.01); *B23Q 17/0971* (2013.01); *B23Q 17/10* (2013.01); *B23Q 17/20* (2013.01); *B23Q 17/2409* (2013.01); *B28D 5/022* (2013.01)

(58) Field of Classification Search
CPC ................ B25D 7/005; B23Q 17/0961; B23Q 17/0971; B23Q 17/12; B23Q 17/10; B23Q 17/2409; B28D 5/022
See application file for complete search history.

(56) References Cited

U.S. PATENT DOCUMENTS

| 6,338,024 B1* | 1/2002 | Taniguchi | B23Q 17/12 318/560 |
| 2011/0222980 A1* | 9/2011 | Kuo | B23Q 11/0039 409/80 |
| 2012/0253708 A1* | 10/2012 | Tanaka | B23Q 11/0039 702/56 |
| 2014/0298968 A1* | 10/2014 | Hirosawa | H01L 21/78 83/39 |
| 2015/0020666 A1* | 1/2015 | Wakita | B26D 7/2621 83/401 |

(Continued)

FOREIGN PATENT DOCUMENTS

| JP | 05-326700 | 12/1993 |
| JP | 2011-066233 | 3/2011 |

*Primary Examiner* — Omar Flores Sanchez
(74) *Attorney, Agent, or Firm* — Greer Burns & Crain Ltd.

(57) ABSTRACT

A processing system includes a processing apparatus having functional units including a holding unit that holds a workpiece by a holding surface, a processing unit that processes the workpiece held by the holding unit, and a feed unit that moves the holding unit and the processing unit relatively. The processing system further includes a detecting unit that is provided for part or all of the functional units and detects any of vibration, current, voltage, load, speed, torque, pressure, temperature, flow rate, change in a taken image, and the thickness of the workpiece, and a data accumulating unit that accumulates information included in a signal output from the detecting unit as data.

8 Claims, 11 Drawing Sheets

(56) References Cited

U.S. PATENT DOCUMENTS

2015/0020667 A1* 1/2015 Wakita .................... B24B 45/00
83/401
2015/0020670 A1* 1/2015 Wakita .................... B27B 5/325
83/522.12

* cited by examiner

PROCESSING SYSTEM

BACKGROUND OF THE INVENTION

Field of the Invention

The present invention relates to a processing system including a processing apparatus that processes a plate-shaped workpiece (processing-target object).

Description of the Related Art

When a wafer including a material such as a semiconductor or a ceramic material is processed into chips, processing apparatuses such as a cutting apparatus, a laser processing apparatus, and a grinding apparatus are widely used. These processing apparatuses generally move a holding table that holds a wafer and a processing unit relative to each other to thereby process the wafer on the basis of a preset processing condition and so forth.

Incidentally, if the respective units of a processing apparatus involve a defect or if change over time occurs, or the like, a desired processing result is not obtained in many cases. For example, in a cutting apparatus, chipping of the wafer becomes large and a defective chip is easily generated if the position of a nozzle that supplies a cutting liquid such as water in cutting processing deviates or if clogging occurs in a cutting blade, or the like. In order to prevent such processing failure, an operator checks the position of the nozzle and predicts the timing of clogging to carry out adjustment of the processing condition, dressing of the cutting blade, and so forth (for example refer to Japanese Patent Laid-open No. Hei 5-326700). Moreover, an operator periodically checks the position of a kerf (cut edge), the size of chipping, and so forth to prepare for processing failure that suddenly occurs (for example refer to Japanese Patent Laid-open No. 2011-66233).

SUMMARY OF THE INVENTION

However, the above-described method involves a problem that the occurrence of processing failure cannot be necessarily properly prevented and it is impossible to rapidly respond to processing failure that suddenly occurs.

Thus, an object of the present invention is to provide a processing system that can prevent the occurrence of problems such as processing failure and apparatus failure and also respond to the occurrence of a sudden problem.

In accordance with an aspect of the present invention, there is provided a processing system including a processing apparatus having functional units including a holding unit that holds a workpiece by a holding surface, a processing unit that processes the workpiece held by the holding unit, and a feed unit that moves the holding unit and the processing unit relatively. The processing system further includes a detecting unit that is provided for part or all of the functional units and detects any of vibration, current, voltage, load, speed, torque, pressure, temperature, flow rate, change in a taken image, and the thickness of the workpiece, and a data accumulating unit that accumulates information included in a signal output from the detecting unit as data.

In one aspect of the present invention, it is preferable that the data accumulated in the data accumulating unit be used for any of quality control of the workpiece, management of the functional units, management of continuous operation, investigation of cause of a breakdown, and examination of an operation error.

Furthermore, in one aspect of the present invention, it is preferable that the processing system further include a measuring unit that measures the quality of the workpiece processed by the processing apparatus.

Moreover, in one aspect of the present invention, it is preferable that the processing system have the following configuration. Specifically, the processing system further includes an XY-position detecting unit that detects the position of the holding unit or the processing unit in an XY-plane parallel to the holding surface. Furthermore, the data accumulating unit associates information included in a signal output from the detecting unit with the position detected by the XY-position detecting unit and accumulates the information as the data.

In addition, in one aspect of the present invention, it is preferable that the processing system further include a data output unit that outputs the data accumulated in the data accumulating unit.

Furthermore, in one aspect of the present invention, it is preferable that the processing system further include a determining unit that determines the states of the functional units on the basis of the data accumulated in the data accumulating unit.

Moreover, in one aspect of the present invention, it is preferable that the processing system have the following configuration. Specifically, the processing system further includes a normal data storing unit that stores information included in a signal output from the detecting unit when the functional units are normal as normal data. Furthermore, the determining unit compares the data accumulated in the data accumulating unit and the normal data stored in the normal data storing unit and determines the states of the functional units.

In addition, in one aspect of the present invention, it is preferable that the processing system have the following configuration. Specifically, the processing apparatus is a cutting apparatus including, as the processing unit, a cutting unit in which a cutting blade that carries out cutting processing of the workpiece held by the holding unit is mounted. Furthermore, the cutting apparatus includes a vibration detecting unit that detects vibration of the cutting blade as the detecting unit, and information on vibration when cutting processing of the workpiece is carried out by the cutting blade is accumulated in the data accumulating unit as the data. Moreover, information on vibration when cutting processing of the workpiece is carried out by a proper cutting blade corresponding to the workpiece is stored in the normal data storing unit as the normal data, and the determining unit compares the data accumulated in the data accumulating unit and the normal data stored in the normal data storing unit and determines whether or not cutting processing of the workpiece is normally carried out.

Furthermore, in one aspect of the present invention, it is preferable that the determining unit compare the data accumulated in the data accumulating unit and the normal data stored in the normal data storing unit and determine whether or not the cutting blade mounted in the cutting unit is proper.

Moreover, in one aspect of the present invention, it is preferable that the determining unit compare the data accumulated in the data accumulating unit and the normal data stored in the normal data storing unit and determine any of chipping, the degree of wear, and occurrence of clogging regarding the cutting blade mounted in the cutting unit.

In addition, in one aspect of the present invention, it is preferable that the processing system have the following configuration. Specifically, the processing system further includes a Z-position detecting unit that detects the position of the cutting unit in a Z-axis direction perpendicular to the holding surface. Furthermore, the vibration detecting unit outputs a signal corresponding to vibration when the cutting blade mounted in the cutting unit moves in the Z-axis direction and gets contact with a circumferential part of the holding unit. Moreover, the data accumulating unit associates information on the vibration when the cutting blade gets contact with the circumferential part with the position in the Z-axis direction detected by the Z-position detecting unit and accumulates the information as contact data, and the determining unit determines that a position in the Z-axis direction when the cutting blade gets contact with the circumferential part is the position of a cut-in origin of the cutting blade on the basis of the contact data.

The processing system according to one aspect of the present invention includes the detecting unit that is provided for the functional units such as the holding unit, the processing unit, and the feed unit and detects vibration, current, load, and so forth necessary to determine the states of the functional units and so forth, and the data accumulating unit that accumulates information included in a signal output from the detecting unit as data. This can prevent the occurrence of problems such as processing failure and apparatus failure and also respond to the occurrence of a sudden problem by utilizing the accumulated data.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
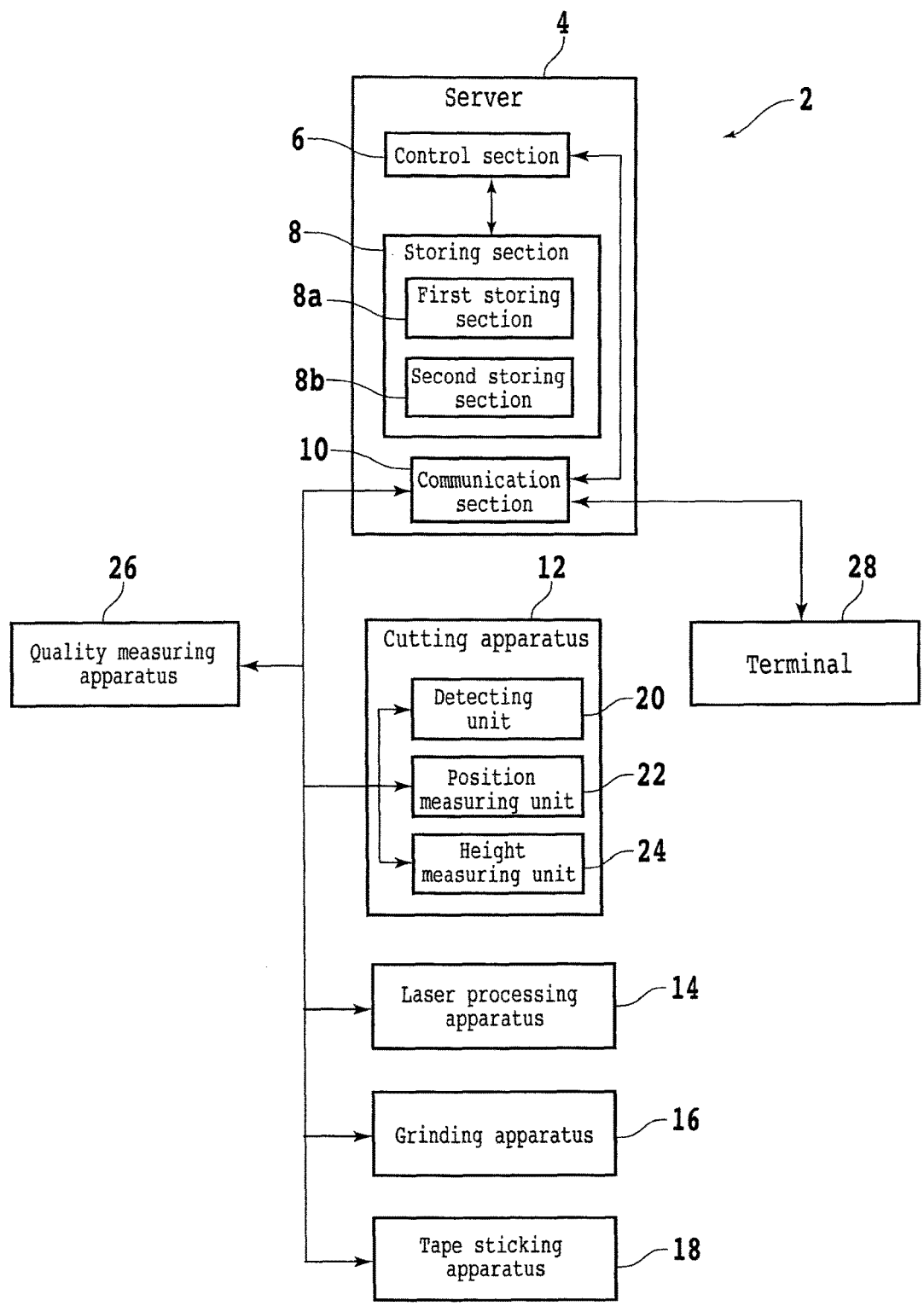
FIG. 1 is a block diagram schematically showing a configuration example of a processing system.

An embodiment of the present invention will be described below with reference to the accompanying drawings. FIG. 1 is a block diagram schematically showing a configuration example of a processing system according to the present embodiment. A processing system 2 according to the present embodiment is used when a plate-shaped workpiece 11 (see FIG. 2 and so forth) including a material such as a semiconductor or a ceramic material is processed for example, and includes a server 4 for managing various kinds of information as shown in FIG. 1. The server 4 includes a control section (determining unit, determining means) 6 that executes information processing, a storing section 8 that stores information as data, and a communication section (data output unit, data output means) 10 that carries out communications. To this server 4, the following processing apparatuses are connected: a cutting apparatus 12 that carries out cutting processing of the workpiece 11, a laser processing apparatus 14 that carries out laser processing of the workpiece 11, a grinding apparatus 16 that carries out grinding processing (or polishing processing) of the workpiece 11, a tape sticking apparatus 18 that sticks a tape 13 (see FIG. 2 and so forth) to the workpiece 11, and so forth.

As shown in FIG. 1, for example, the cutting apparatus 12 is provided with one or two or more detecting units (detecting means) 20 that detect vibration, current, voltage, load, speed, torque, pressure, temperature, flow rate, change (difference) in a taken image, the thickness of the workpiece 11, and so forth relating to the respective functional elements (functional units, functional means) configuring the cutting apparatus 12 and output a signal. Information included in the signal output from each detecting unit 20 (hereinafter, detection information) is accumulated as data in a first storing section (data accumulating unit, data accumulating means) 8a in the storing section 8 via the communication section 10 and the control section 6 for example. For example, this data is used for quality control of the workpiece 11, management of the functional elements, management of continuous operation, investigation of cause of a breakdown, examination of an operation error, and so forth. Furthermore, as described later, part or all of the information included in the signal output from each detecting unit 20 (detection information) is often accumulated in the first storing section 8a as data corresponding to a measurement result by a position measuring unit (XY-position detecting unit, XY-position detecting means) 22 or a height measuring unit (Z-position detecting unit, Z-position detecting means) 24 of the cutting apparatus 12. In FIG. 1, for convenience of explanation, only the detecting unit 20, the position measuring unit 22, and the height measuring unit 24 included in the cutting apparatus 12 are exemplified. However, part or all of them are provided also in processing apparatuses such as the laser processing apparatus 14, the grinding apparatus 16, and the tape sticking apparatus 18. Furthermore, there is no limit to the kinds, number, and so forth of processing apparatuses connected to the server 4.

Moreover, to the server 4, a quality measuring apparatus (measuring unit, measuring means) 26 that measures the quality and so forth of the workpiece 11 processed by processing apparatuses such as the cutting apparatus 12, the laser processing apparatus 14, the grinding apparatus 16, and the tape sticking apparatus 18 is connected. For example, this quality measuring apparatus 26 measures the quality of the workpiece 11 represented by chipping of the workpiece 11, an foreign substance (contamination) adhering to the workpiece 11, variation in the thickness of the workpiece 11, the state (depth and so forth) of a kerf (cut edge) formed in the workpiece 11, and so forth. Information relating to the quality obtained by the measurement (hereinafter, quality information) is accumulated as data in the first storing section 8a via the communication section 10 and the control section 6 for example. When this quality information is analyzed by being checked against the above-described detection information, the correlation between problems such as processing failure and apparatus failure that occur in a processing apparatus such as the cutting apparatus 12 and the detection result of the respective detecting units 20 can be identified. Thus, for example, prevention and solution of the problems are enabled by deciding thresholds or the like indicating proper ranges of vibration, current, voltage, load, speed, torque, pressure, temperature, flow rate, and so forth detected by the respective detecting units 20 and monitoring changes in them in real time.

Furthermore, a terminal 28 for operation typified by a personal computer is connected to the server 4. For example, data corresponding to the detection information or data corresponding to the quality information is output from the communication section 10 to the terminal 28. This allows an operator to analyze the detection information or the quality information on the terminal 28 and decide a condition such as the thresholds or the like indicating the proper ranges. The decided condition is stored in the storing section 8 via the communication section 10 and the control section 6 for example. In a second storing section (normal data storing unit, normal data storing means) 8b in the storing section 8, information included in a signal output from the detecting unit 20 when the respective functional elements are normal can be stored as normal data. For example, the control section 6 compares information possessed by the data accumulated in the first storing section 8a in processing treatment with the condition decided in the above-described manner, information possessed by the normal data, or the like and executes the processing or instruction necessary for prevention and solution of problems.

Figure 2:
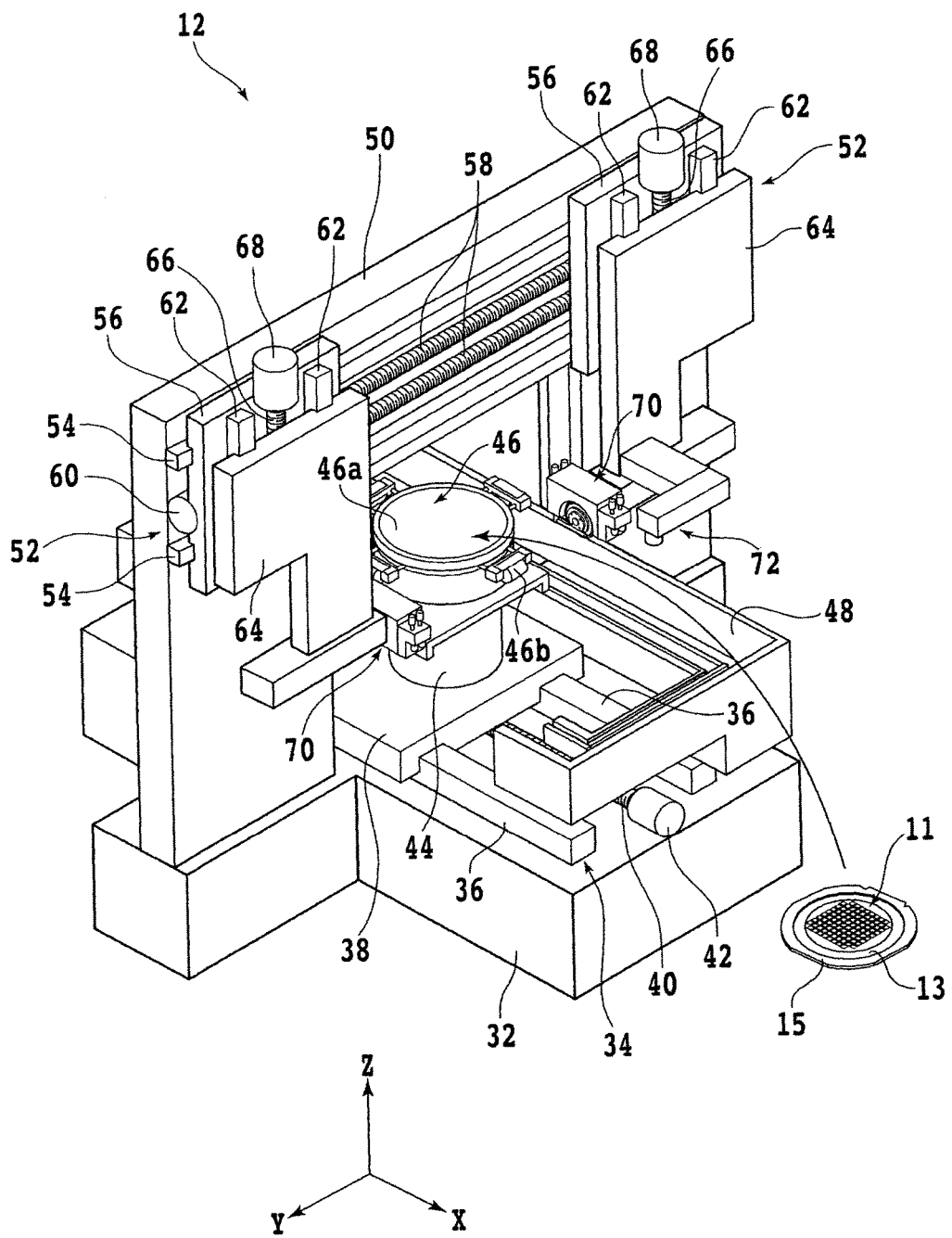
FIG. 2 is a perspective view schematically showing a configuration example of a cutting apparatus.

Next, details of the above-described cutting apparatus 12, laser processing apparatus 14, and grinding apparatus 16 will be described. FIG. 2 is a perspective view schematically showing a configuration example of the cutting apparatus 12. As shown in FIG. 2, the cutting apparatus 12 includes a base 32 that supports the respective constituent elements. On the upper surface of the base 32, an X-axis movement mechanism (feed unit, feed means, functional unit, functional means) 34 is provided. The X-axis movement mechanism 34 includes a pair of X-axis guide rails 36 parallel to the X-axis direction (processing feed direction of the cutting apparatus 12) and an X-axis movement table 38 is slidably attached to the X-axis guide rails 36. A nut part (not shown) is provided on the lower surface side of the X-axis movement table 38 and an X-axis ball screw 40 parallel to the X-axis guide rails 36 is screwed to this nut part.

An X-axis pulse motor 42 is joined to one end part of the X-axis ball screw 40. By rotating the X-axis ball screw 40 by the X-axis pulse motor 42, the X-axis movement table 38 moves in the X-axis direction along the X-axis guide rails 36. This X-axis movement mechanism 34 is provided with an X-axis measuring unit (not shown) that measures the position of the X-axis movement table 38 in the X-axis direction. A table base 44 is provided on the front surface side (upper surface side) of the X-axis movement table 38. Over the table base 44, a chuck table (holding means, functional means) 46 that sucks and holds the workpiece 11 is disposed. Four clamps 46b that fix, from four sides, a ring-shaped frame 15 that supports the workpiece 11 are set around the chuck table 46.

The workpiece 11 is a circular wafer including a semiconductor such as silicon for example, and its front surface side is divided into a central device region and a peripheral surplus region surrounding the device region. The device region is further segmented into plural regions by planned dividing lines (streets) arranged in a lattice manner and devices such as ICs and LSIs are formed in each region. The tape 13 having a larger diameter than the workpiece 11 is stuck to the back surface side of the workpiece 11. The peripheral part of the tape 13 is fixed to the ring-shaped frame 15. That is, the workpiece 11 is supported by the frame 15 with the intermediary of the tape 13. Although a circular wafer including a semiconductor such as silicon is employed as the workpiece 11 in the present embodiment, there is no limit to the material, shape, and so forth of the workpiece 11. For example, it is also possible to use a substrate that includes a material such as a ceramic material, a resin, or a metal and has an arbitrary shape as the workpiece 11.

The chuck table 46 is joined to a rotational drive source (not shown) such as a motor and rotates around a rotation axis parallel to the Z-axis direction (vertical direction, height direction). Furthermore, when the X-axis movement table 38 is moved in the X-axis direction by the above-described X-axis movement mechanism 34, processing feeding of the chuck table 46 is carried out in the X-axis direction. The position of the chuck table 46 in the X-axis direction can be measured by the X-axis measuring unit. The upper surface of the chuck table 46 is a holding surface 46a that holds the workpiece 11. This holding surface 46a is formed substantially parallel to the X-axis direction and the Y-axis direction and is connected to a suction source (not shown) via a flow path (not shown) and so forth formed inside the chuck table 46 and the table base 44. The negative pressure of this suction source is used also when the chuck table 46 is fixed to the table base 44.

A conveying unit (not shown) that conveys the workpiece 11 to the chuck table 46 is provided at a position close to the chuck table 46. Furthermore, a water case 48 that temporarily stores a cutting liquid (waste liquid) such as purified water used at the time of cutting processing is provided around the chuck table 46. The waste liquid stored in the water case 48 is discharged outside the cutting apparatus 12 via a drain (not shown) or the like.

A gate-shaped support structure 50 that straddles the X-axis movement mechanism 34 is disposed on the upper surface of the base 32. At the upper part of the front surface of the support structure 50, two cutting unit movement mechanisms (feed units, feed means, functional units, functional means) 52 are provided. Each cutting unit movement mechanism 52 includes, in common, a pair of Y-axis guide rails 54 that are disposed on the front surface of the support structure 50 and are parallel to the Y-axis direction (indexing feed direction of the cutting apparatus 12). Y-axis movement plates 56 forming the respective cutting unit movement mechanisms 52 are slidably attached to the Y-axis guide rails 54. A nut part (not shown) is provided on the back surface side of each Y-axis movement plate 56 and Y-axis ball screws 58 parallel to the Y-axis guide rails 54 are each screwed to a respective one of the nut parts. A Y-axis pulse motor 60 is joined to one end part of each Y-axis ball screw 58. When the Y-axis ball screw 58 is rotated by the Y-axis pulse motor 60, the Y-axis movement plate 56 moves in the Y-axis direction along the Y-axis guide rails 54.

A pair of Z-axis guide rails 62 parallel to the Z-axis direction are provided on the front surface of each Y-axis movement plate 56. Z-axis movement plates 64 are slidably attached to the Z-axis guide rails 62. A nut part (not shown) is provided on the back surface side of each Z-axis movement plate 64 and Z-axis ball screws 66 parallel to the Z-axis guide rails 62 are each screwed to a respective one of the nut parts. A Z-axis pulse motor 68 is joined to one end part of each Z-axis ball screw 66. When the Z-axis ball screw 66 is rotated by the Z-axis pulse motor 68, the Z-axis movement plate 64 moves in the Z-axis direction along the Z-axis guide rails 62.

Each cutting unit movement mechanism 52 is provided with a Y-axis measuring unit (not shown) that measures the position of the Y-axis movement plate 56 in the Y-axis direction. This Y-axis measuring unit functions as the above-described position measuring unit 22 together with the X-axis measuring unit. Furthermore, each cutting unit movement mechanism 52 is provided with a Z-axis measuring unit (not shown) that measures the position of the Z-axis movement plate 64 in the Z-axis direction. This Z-axis measuring unit functions as the above-described height measuring unit 24.

A cutting unit (cutting means, processing unit, processing means, functional unit, functional means) 70 is provided under each Z-axis movement plate 64. This cutting unit 70 includes a nozzle that supplies a cutting liquid such as purified water. Furthermore, a camera 72 that images the workpiece 11 is provided at a position adjacent to the cutting unit 70. This camera 72 is one of the above-described detecting units 20 and images the workpiece 11 to detect change in an image in association with the elapse of processing, and so forth, for example. When the Y-axis movement plate 56 is moved in the Y-axis direction by each cutting unit movement mechanism 52, indexing feeding of the cutting unit 70 and the camera 72 is carried out in the Y-axis direction perpendicular to the X-axis direction. Furthermore, when the Z-axis movement plate 64 is moved in the Z-axis direction by the cutting unit movement mechanism 52, the cutting unit 70 and the camera 72 move up and down. The position of the cutting unit 70 in the Y-axis direction can be measured by the Y-axis measuring unit and the position of the cutting unit 70 in the Z-axis direction can be measured by the Z-axis measuring unit.

Figure 3:
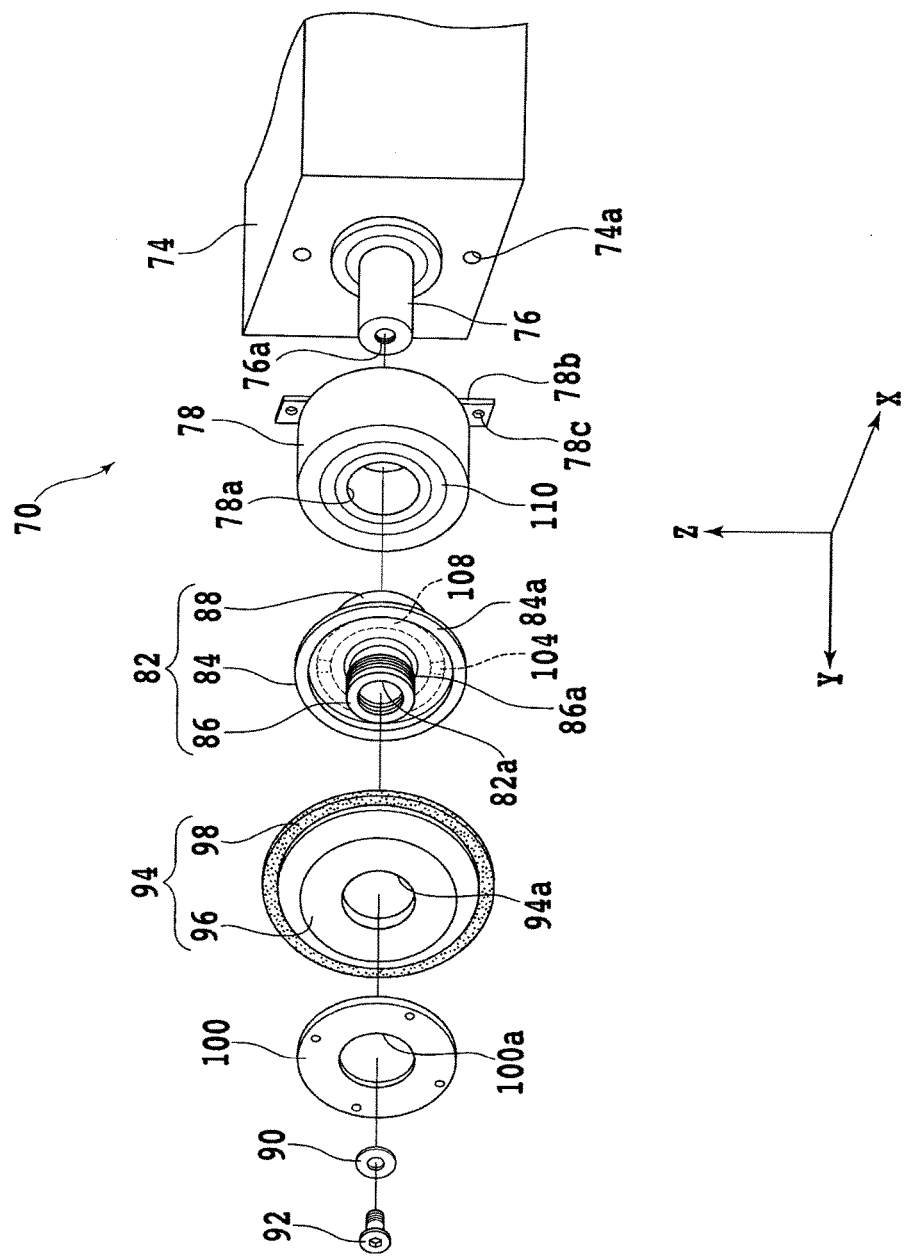
FIG. 3 is an exploded perspective view schematically showing the structure of a cutting unit.
Figure 4:
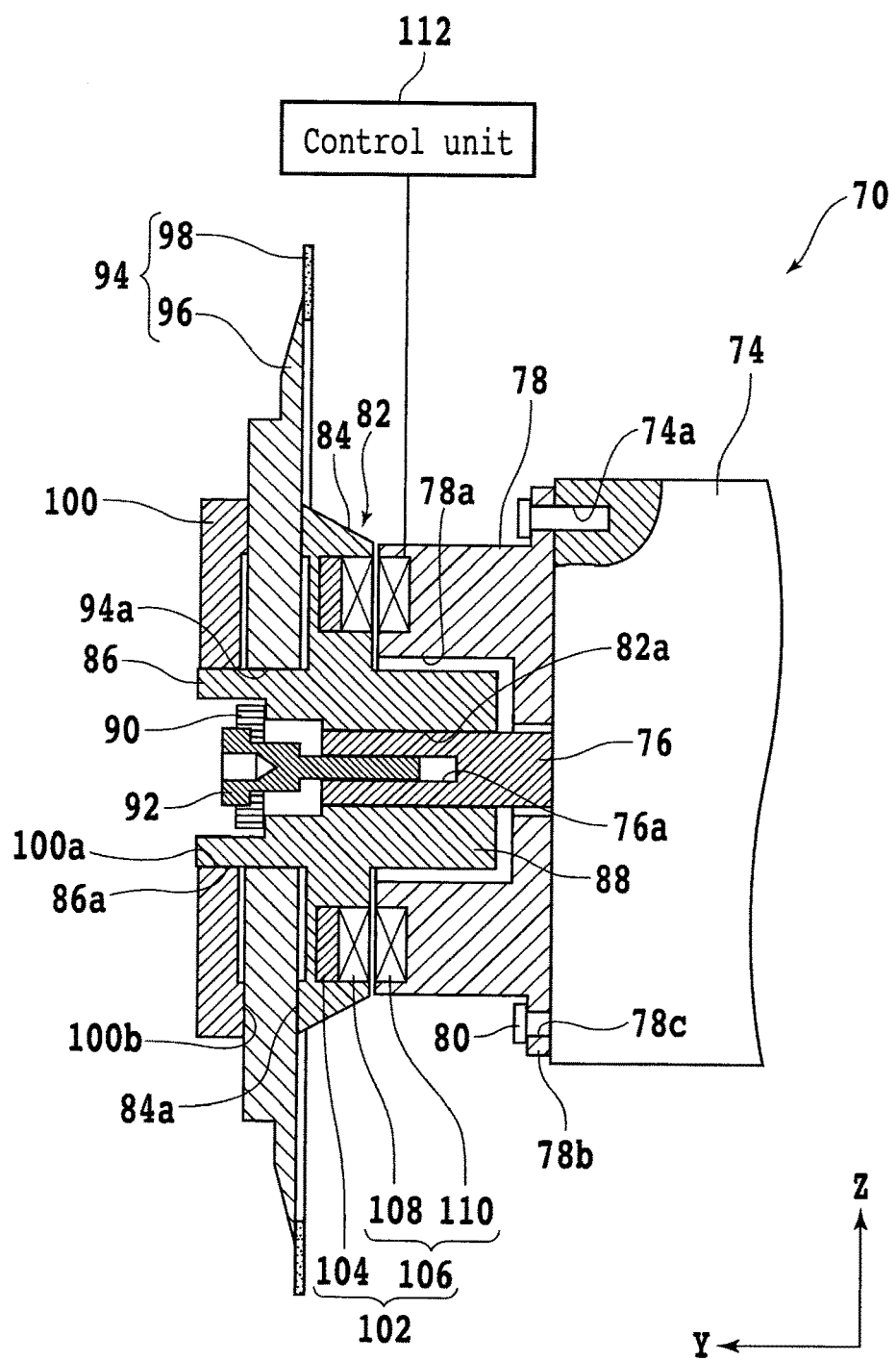
FIG. 4 is a diagram schematically showing a section of the cutting unit and so forth.

FIG. 3 is an exploded perspective view schematically showing the structure of the cutting unit 70 and FIG. 4 is a diagram schematically showing a section and so forth of the cutting unit 70. In FIG. 3 and FIG. 4, part of the constituent elements of the cutting unit 70 is omitted. The cutting unit 70 includes a tubular spindle housing 74 fixed to the lower part of the Z-axis movement plate 64. A spindle 76 forming a rotating shaft parallel to the Y-axis direction is housed inside the spindle housing 74. On end part of the spindle 76 protrudes from the spindle housing 74 to the outside. Furthermore, a rotational drive source (not shown) such as a motor that rotates the spindle 76 is joined to the other end side of the spindle 76. The rotational drive source is provided with a current detecting unit that detects the current. This current detecting unit is one of the above-described detecting units 20 and detects the current of the motor forming the rotational drive source for example.

A cover unit 78 having a circular disc shape is fixed to one end part of the spindle housing 74. An opening 78a is formed at the center of the cover unit 78 and the one end part of the spindle 76 is made to pass through this opening 78a. Furthermore, a locking part 78b is provided at part of the outer circumference of the cover unit 78. When the one end part of the spindle 76 is made to pass through the opening 78a and a screw 80 (FIG. 4) is fastened into a screw hole 74a of the spindle housing 74 through an opening 78c of the locking part 78b, the cover unit 78 can be fixed to the spindle housing 74.

A flange member 82 is mounted on the one end part of the spindle 76. The flange member 82 includes a flange part 84 having a circular disc shape and a first boss part 86 and a second boss part 88 that protrude from the center of the front and back surfaces of the flange part 84. At the center of the flange member 82, an opening 82a that penetrates the first boss part 86, the flange part 84, and the second boss part 88 is formed. The one end part of the spindle 76 is fitted into the opening 82a of the flange part 82 from the back surface side (side closer to the spindle housing 74). In this state, a washer 90 is disposed in the opening 82a and a bolt 92 for fixing is fastened into a bolt hole 76a of the spindle 76 through this washer 90. This fixes the flange member 82 to the spindle 76.

The front surface of the outer circumferential side of the flange part 84 serves as a contact surface 84a that gets contact with the back surface of a cutting blade 94. This contact surface 84a is formed into a circular ring shape as viewed in the Y-axis direction (shaft center direction of the spindle 76). The first boss part 86 is formed into a cylindrical shape and a screw thread is made on an outer circumferential surface 86a at its tip side. A circular opening 94a is formed at the center of the cutting blade 94. By causing the first boss part 86 to pass through this opening 94a, the cutting blade 94 is mounted on the flange member 82.

The cutting blade 94 is a so-called hub blade and a cutting edge 98 that is for cutting processing of the workpiece 11 and has a circular ring shape is fixed to the outer circumference of a support base 96 having a circular disc shape. The cutting edge 98 is formed to a predetermined thickness by mixing abrasive grains of diamond, cubic boron nitride (CBN), or the like in a bond material (binding material) of a metal, a resin, or the like for example. As the cutting blade 94, a washer blade composed only of a cutting edge may be used. In the state in which this cutting blade 94 is mounted on the flange member 82, a plate member 100 having a circular ring shape is disposed on the front surface side of the cutting blade 94. A circular opening 100a is formed at the central part of the plate member 100 and a screw groove corresponding to the screw thread formed on the outer circumferential surface 86a of the first boss part 86 is made in the inner wall surface of this opening 100a. The back surface of the outer circumferential side of the plate member 100 serves as a contact surface 100b (FIG. 4) that gets contact with the front surface of the cutting blade 94. The contact surface 100b is provided at a position corresponding to the contact surface 84a of the flange member 82. By fastening the tip of the first boss part 86 into the opening 100a of this plate member 100, the cutting blade 94 is clamped by the flange member 82 and the plate member 100.

In the cutting unit 70 formed in this manner, a vibration detecting unit (vibration detecting means) 102 for detecting vibration of the cutting blade 94 and so forth is provided as shown in FIG. 4. The vibration detecting unit 102 is one of the above-described detecting units 20 and includes an ultrasonic vibrator 104 fixed inside the flange member 82. The ultrasonic vibrator 104 is formed of a material such as barium titanate ($BaTiO_3$), lead zirconate titanate (Pb(Zi, Ti)$O_3$), lithium niobate ($LiNbO_3$), or lithium tantalate ($LiTaO_3$) for example, and converts vibration of the cutting blade 94 and so forth to a voltage (signal). This ultrasonic vibrator 104 is configured to resonate with respect to vibration at a predetermined frequency. Therefore, the frequency of the vibration that can be detected by the vibration detecting unit 102 is determined depending on the resonant frequency of the ultrasonic vibrator 104. Thus, by selectively using plural flange members 82 different in the resonant frequency of the ultrasonic vibrator 104, the vibration detecting unit 102 can be optimized according to the kinds of cutting blade 94 and workpiece 11 (material, size, weight, and so forth), the form of abnormality whose frequency of occurrence is high, and so forth.

For example, three kinds of flange members 82 in which the resonant frequency of the ultrasonic vibrator 104 is 50 kHz to 100 kHz, 100 kHz to 300 kHz, and 300 kHz to 500 kHz are prepared and selectively used. This can properly detect vibration in a frequency range of 50 kHz to 500 kHz. Plural ultrasonic vibrators 104 different in the resonant frequency may be provided in one flange member 82 so that vibration in a wide frequency range can be detected without replacing the flange member 82. For example, when three kinds of ultrasonic vibrators 104 whose resonant frequency is 50 kHz to 100 kHz, 100 kHz to 300 kHz, and 300 kHz to 500 kHz are provided in one flange member 82, vibration in a frequency range of 50 kHz to 500 kHz can be detected without replacing the flange member 82.

It is preferable for the ultrasonic vibrator 104 to be disposed symmetrically with respect to the shaft center of the spindle 76. This can detect vibration of the cutting blade 94 with high accuracy. Furthermore, the number, placement, shape, and so forth of the ultrasonic vibrators 104 are not limited to the form shown in FIG. 3 and FIG. 4. For example, the number of ultrasonic vibrators 104 included in the flange member 82 may be one.

The voltage generated by the ultrasonic vibrator 104 is transmitted via a contactless transmission path 106. This transmission path 106 includes a first inductor 108 connected to the ultrasonic vibrator 104 and a second inductor 110 opposed to the first inductor 108 at a predetermined interval. The first inductor 108 and the second inductor 110 are typically coils that are obtained by concentrically winding a conductive wire and have a circular ring shape, and are respectively fixed on the back surface side (side closer to the cover unit 78) of the flange member 82 and the front surface side (side closer to the flange member 82) of the cover unit 78. As described above, the first inductor 108 and the second inductor 110 are opposed and electromagnetically coupled. Therefore, the voltage generated by the ultrasonic vibrator 104 is transmitted to the side of the second inductor 110 by mutual induction between the first inductor 108 and the second inductor 110. A control unit 112 of the cutting apparatus 12 is connected to the second inductor 110. For example, this control unit 112 converts the voltage transmitted from the second inductor 110 to a signal for transmission and sends the signal to the server 4. For example, the control section 6 of the server 4 performs a Fourier transform (fast Fourier transform) on the signal sent from the control unit 112 (signal equivalent to time change of the voltage) and accumulates the result in the first storing section 8a. This Fourier transform may be performed in the control unit 112.

When cutting processing of the workpiece 11 is carried out by the cutting apparatus 12 formed in this manner, for example, while the cutting blade 94 is rotated at high speed, the cutting blade 94 is lowered to such a height as to be capable of getting contact with the workpiece 11 on the chuck table 46. Then, in this state, processing feeding of the chuck table 46 is carried out in the X-axis direction. This can make the cutting blade 94 cut into the workpiece 11 and carry out the cutting processing of the workpiece 11 along the X-axis direction. The workpiece 11 after the cutting processing is cleaned in an adjacent cleaning unit (not shown).

Figure 5:
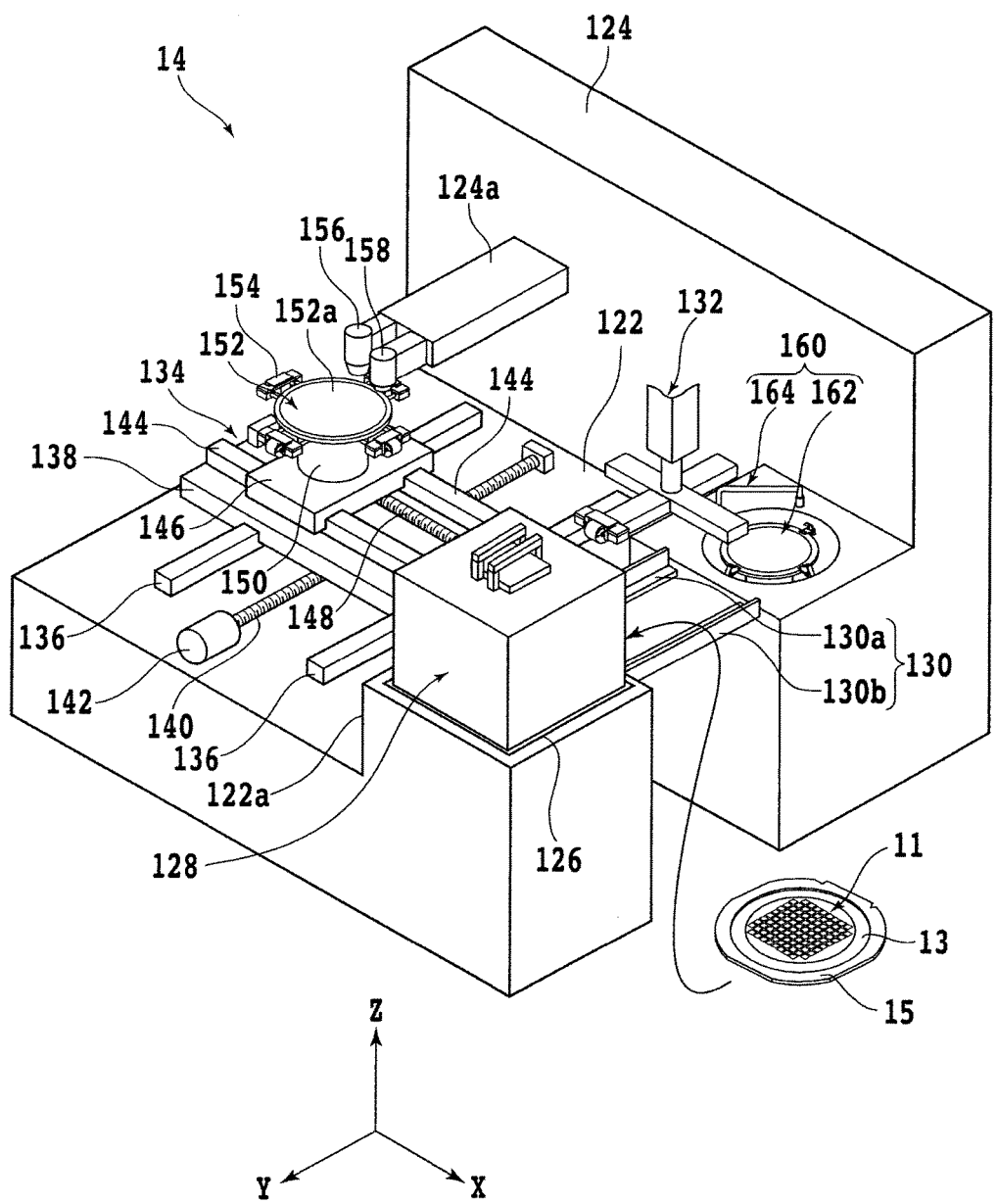
FIG. 5 is a perspective view schematically showing a configuration example of a laser processing apparatus.

FIG. 5 is a perspective view schematically showing a configuration example of the laser processing apparatus 14. As shown in FIG. 5, the laser processing apparatus 14 includes a base 122 that supports the respective constituent elements. At an end part of the base 122, a wall-shaped support structure 124 extending in the Z-axis direction (vertical direction, height direction) is provided. A protruding part 122a that protrudes upward is made at a corner part of the base 122 separate from the support structure 124. A space is formed inside the protruding part 122a and a cassette elevator 126 that can move up and down is set in this space. A cassette 128 in which plural workpieces 11 can be housed is placed on the upper surface of the cassette elevator 126. A temporary placement mechanism 130 on which to temporarily place the workpiece 11 is provided at a position adjacent to the protruding part 122a. The temporary placement mechanism 130 includes a pair of guide rails 130a and 130b made to get closer to and farther away from each other, with the guide rails 130a and 130b kept parallel to the Y-axis direction (indexing feed direction of the laser processing apparatus 14). The guide rails 130a and 130b each include a support surface to support the workpiece 11 and a side surface perpendicular to the support surface and clamp the workpiece 11 (ring-shaped frame 15) drawn from the cassette 128 by a conveying unit 132 in the X-axis direction (processing feed direction of the laser processing apparatus 14) to align the workpiece 11 at a predetermined position.

A chuck table movement mechanism (feed unit, feed means, functional unit, functional means) 134 is provided at the center of the base 122. The chuck table movement mechanism 134 includes a pair of Y-axis guide rails 136 that are disposed on the upper surface of the base 122 and are parallel to the Y-axis direction. A Y-axis movement table 138 is slidably attached to the Y-axis guide rails 136. A nut part (not shown) is provided on the back surface side (lower surface side) of the Y-axis movement table 138 and a Y-axis ball screw 140 parallel to the Y-axis guide rails 136 is screwed to this nut part. A Y-axis pulse motor 142 is joined to one end part of the Y-axis ball screw 140. When the Y-axis ball screw 140 is rotated by the Y-axis pulse motor 142, the Y-axis movement table 138 moves in the Y-axis direction along the Y-axis guide rails 136.

A pair of X-axis guide rails 144 parallel to the X-axis direction are provided on the front surface (upper surface) of the Y-axis movement table 138. An X-axis movement table 146 is slidably attached to the X-axis guide rails 144. A nut part (not shown) is provided on the back surface side (lower surface side) of the X-axis movement table 146 and an X-axis ball screw 148 parallel to the X-axis guide rails 144 is screwed to this nut part. An X-axis pulse motor (not shown) is joined to one end part of the X-axis ball screw 148. When the X-axis ball screw 148 is rotated by the X-axis pulse motor, the X-axis movement table 146 moves in the X-axis direction along the X-axis guide rails 144.

The chuck table movement mechanism 134 is provided with an XY-axes measuring unit (not shown) that measures the position of the Y-axis movement table 138 in the Y-axis direction and the position of the X-axis movement table 146 in the X-axis direction. This XY-axes measuring unit functions as a position measuring unit (XY-position detecting unit, XY-position detecting means) of the laser processing apparatus 14. A table base 150 is provided on the front surface side (upper surface side) of the X-axis movement table 146. Over the table base 150, a chuck table (holding unit, holding means, functional unit, functional means) 152 that sucks and holds the workpiece 11 is disposed. Four clamps 154 that fix, from four sides, the ring-shaped frame 15 that supports the workpiece 11 are set around the chuck table 152.

The chuck table 152 is joined to a rotational drive source (not shown) such as a motor and rotates around a rotation axis parallel to the Z-axis direction (vertical direction, height direction). When the X-axis movement table 146 is moved in the X-axis direction by the above-described chuck table movement mechanism 134, processing feeding of the chuck table 152 is carried out in the X-axis direction. Furthermore, when the Y-axis movement table 138 is moved in the Y-axis direction by the chuck table movement mechanism 134, indexing feeding of the chuck table 152 is carried out in the Y-axis direction. The position of the chuck table 152 in the X-axis direction and the position thereof in the Y-axis direction can be measured by the XY-axes measuring unit. The upper surface of the chuck table 152 is a holding surface 152a that holds the workpiece 11. This holding surface 152a is formed substantially parallel to the X-axis direction and the Y-axis direction and is connected to a suction source (not shown) via a flow path (not shown) and so forth formed inside the chuck table 152 and the table base 150. The negative pressure of this suction source is used also when the chuck table 152 is fixed to the table base 150.

The support structure 124 is provided with a support arm 124a that protrudes from the front surface and a laser processing unit (processing unit, processing means, functional unit, functional means) 156 that radiates a laser beam downward is disposed at the tip part of this support arm 124a. Furthermore, a camera (detecting unit, detecting means) 158 that images the workpiece 11 is set at a position adjacent to the laser processing unit 156. This camera 158 is one of the detecting units included in the laser processing apparatus 14 and images the workpiece 11 to detect change in an image in association with the elapse of laser processing, and so forth, for example. The laser processing unit 156 irradiates the workpiece 11 held by the chuck table 152 with the laser beam oscillated by a laser oscillator (not shown). For example, by causing processing feeding of the chuck table 152 in the X-axis direction while irradiating the workpiece 11 with the laser beam by the laser processing unit 156, laser processing of the workpiece 11 can be carried out along the X-axis direction.

The workpiece 11 after the processing is conveyed from the chuck table 152 to a cleaning unit 160 by the conveying unit 132 for example. The cleaning unit 160 includes a spinner table 162 that sucks and holds the workpiece 11 in a cleaning space having a cylindrical shape. A rotational drive source (not shown) that rotates the spinner table 162 at a predetermined speed is joined to the lower part of the spinner table 162. Above the spinner table 162, an injection nozzle 164 that injects a fluid for cleaning (typically, two fluids obtained by mixing water and air) toward the workpiece 11 is disposed. The workpiece 11 can be cleaned by rotating the spinner table 162 that holds the workpiece 11 and injecting the fluid for cleaning from the injection nozzle 164. For example, the workpiece 11 cleaned by the cleaning unit 160 is placed on the temporary placement mechanism 130 by the conveying unit 132 and is housed into the cassette 128.

Figure 6:
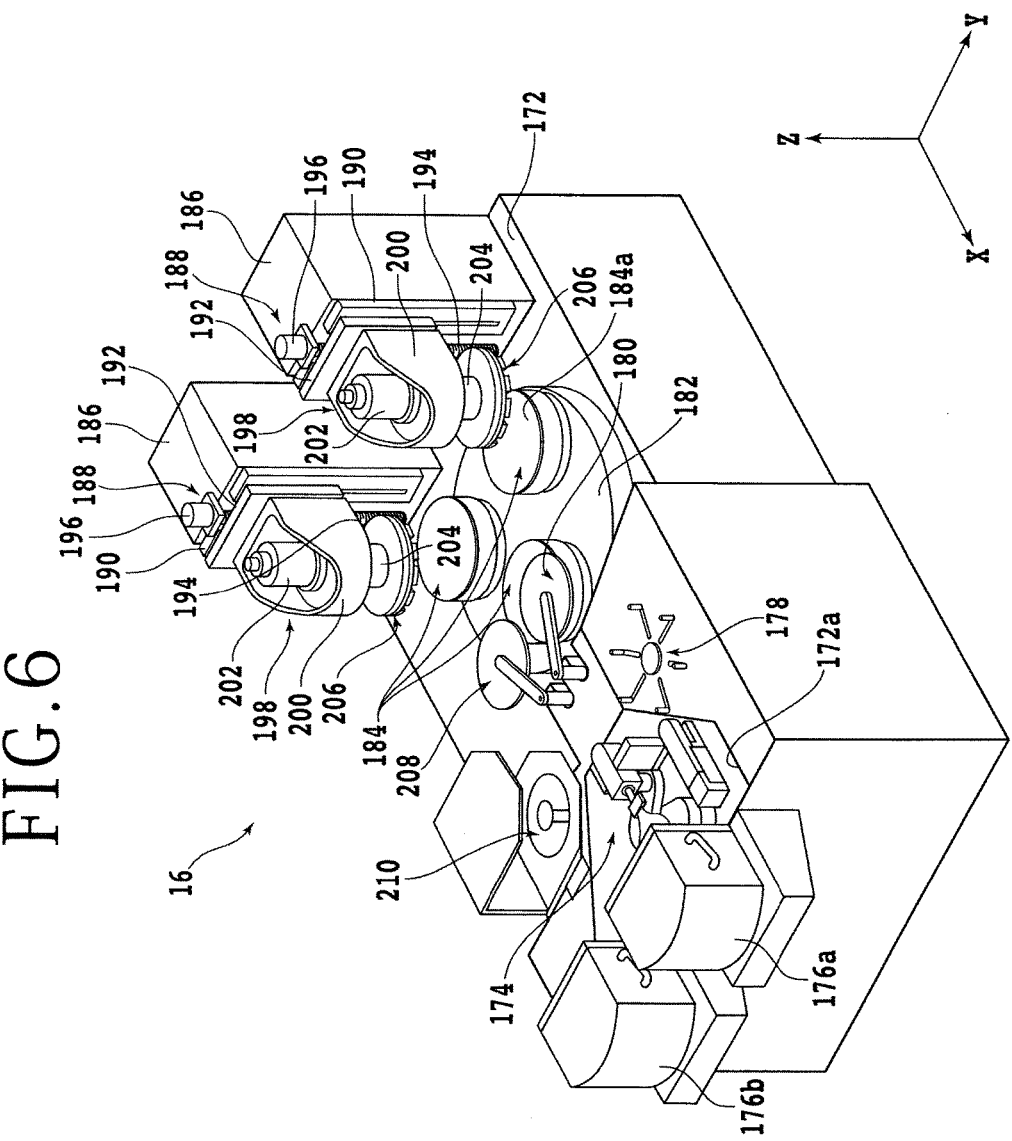
FIG. 6 is a perspective view schematically showing a configuration example of a grinding apparatus.

FIG. 6 is a perspective view schematically showing a configuration example of the grinding apparatus 16. As shown in FIG. 6, the grinding apparatus 16 includes a base 172 that supports the respective constituent elements. An opening 172a is formed in the upper surface of the base 172 and a conveying unit 174 that conveys the workpiece 11 is provided in this opening 172a. Furthermore, cassettes 176a and 176b in which plural workpieces 11 can be housed are placed at an end part of the base 172 close to the opening 172a. An alignment mechanism 178 is provided at a position on the opposite side to the cassette 176a across the opening 172a. For example, this alignment mechanism 178 detects the position of the center of the workpiece 11 conveyed from the cassette 176a by the conveying unit 174. A carry-in unit 180 that sucks and holds the workpiece 11 and pivots is disposed at a position adjacent to the alignment mechanism 178. This carry-in unit 180 includes a suction pad to suck the whole upper surface of the workpiece 11 and conveys the workpiece 11 whose central position has been detected by the alignment mechanism 178 in the opposite direction to the opening 172a.

A turn table 182 that rotates around a rotation axis parallel to the Z-axis direction (processing feed direction of the grinding apparatus 16, vertical direction, height direction) is provided at a position on the opposite side to the opening 172a across the alignment mechanism 178 and the carry-in unit 180. On the upper surface of the turn table 182, three chuck tables (holding units, holding means, functional units, functional means) 184 that suck and hold the workpiece 11 are disposed. There is no limit to the number of chuck tables 184 disposed on the turn table 182. Each chuck table 184 is joined to a rotational drive source (not shown) such as a motor and rotates around a rotation axis parallel to the Z-axis direction. The upper surface of each chuck table 184 is a holding surface 184a that holds the workpiece 11. This holding surface 184a is connected to a suction source (not shown) via a flow path (not shown) and so forth formed inside the chuck table 184. The workpiece 11 carried in by the carry-in unit 180 is held on the chuck table 184 by the negative pressure of the suction source that acts on the holding surface 184a.

Two support structures 186 extending in the vertical direction are provided at an end part of the base 172 close to the turn table 182. Grinding unit movement mechanisms (feed means, functional means) 188 are provided on the front surface side of the respective support structures 186. Each grinding unit movement mechanism 188 includes a pair of Z-axis guide rails 190 that are disposed on the front surface of the support structure 186 and are parallel to the Z-axis direction (processing feed direction). Z-axis movement plates 192 forming the respective grinding unit movement mechanisms 188 are slidably attached to the Z-axis guide rails 190. A nut part (not shown) is provided on the back surface side of each Z-axis movement plate 192 and Z-axis ball screws 194 parallel to the Z-axis guide rails 190 are each screwed to a respective one of the nut parts. A Z-axis pulse motor 196 is joined to one end part of each Z-axis ball screw 194. When the Z-axis ball screw 194 is rotated by the Z-axis pulse motor 196, the Z-axis movement plate 192 moves in the Z-axis direction along the Z-axis guide rails 190.

Grinding units (processing units, processing means, functional units, functional means) 198 are provided on the front surfaces of the respective Z-axis movement plates 192. Each grinding unit 198 includes a spindle housing 202 fixed to the Z-axis movement plate 192 with the intermediary of a fixture 200. A spindle 204 forming a rotating shaft is housed in each spindle housing 202. The lower end part of each spindle 204 protrudes to the outside from the spindle housing 202. Grinding wheels 206 are mounted at the lower end parts of these spindles 204. Each grinding wheel 206 includes a wheel base that is formed of a metal material such as aluminum or stainless steel and has a circular disc shape and plural abrasive stones arranged in a ring manner on the lower surface of the wheel base. Furthermore, rotational drive sources (not shown) such as motors that rotate the spindles 204 are joined to the upper end side of the spindles 204. The rotational drive sources are provided with a current detecting unit that detects the current. This current detecting unit is one of the detecting units included in the grinding apparatus 16 and detects the current of the motor forming the rotational drive source for example.

When the workpiece 11 is held on the chuck table 184, the turn table 182 rotates to move the workpiece 11 to below the grinding unit 198. Thereafter, the grinding unit 198 is lowered in the state in which the chuck table 184 and the grinding wheel 206 are mutually rotated and the abrasive stones included in the grinding wheel 206 are brought into contact with the upper surface of the workpiece 11. This can carry out grinding processing of the workpiece 11. A carry-out unit 208 that sucks and holds the workpiece 11 after the grinding processing and pivots is provided at a position adjacent to the carry-in unit 180. Between the carry-in unit 208 and the opening 172a, a cleaning unit 210 that cleans the workpiece 11 after the grinding processing carried out by the carry-out unit 208 is disposed. The workpiece 11 cleaned by the cleaning unit 210 is conveyed by the conveying unit 174 to be housed in the cassette 176b for example.

Figure 7:
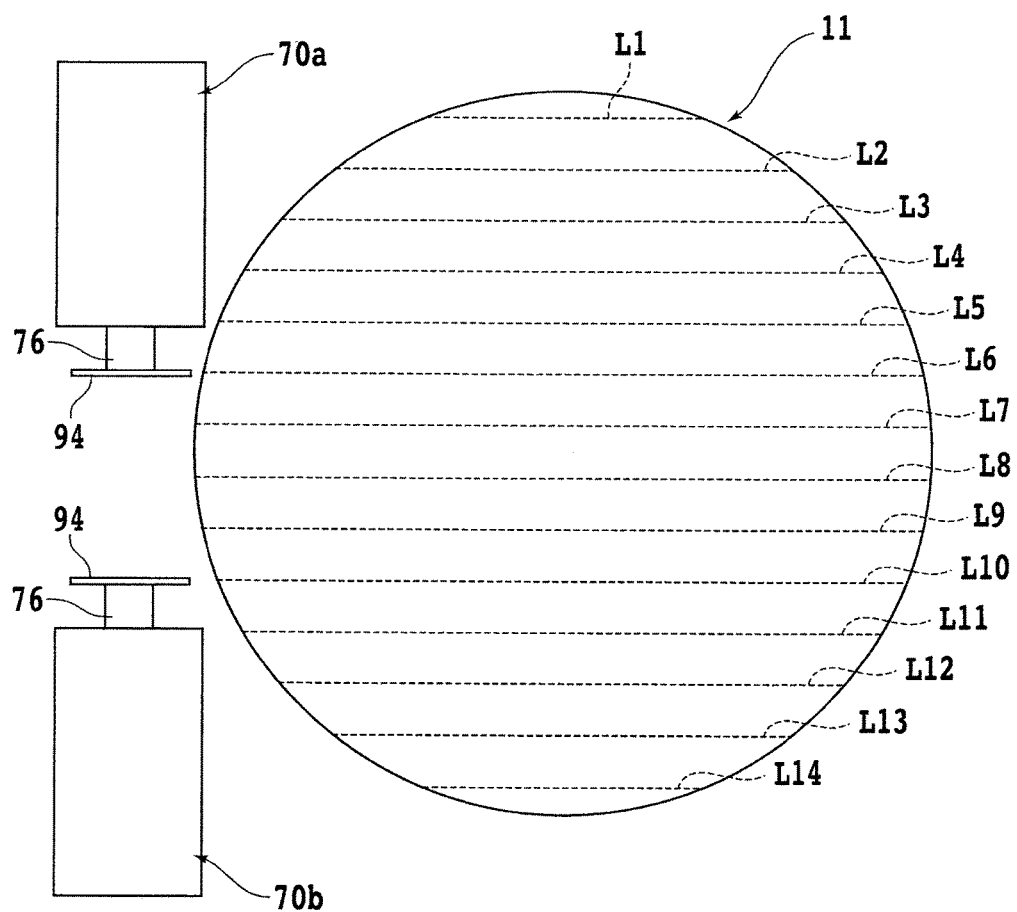
FIG. 7 is a plan view schematically showing how cutting processing of a workpiece is carried out.

Next, one example of the use method of the above-described processing system 2 will be described. FIG. 7 is a plan view schematically showing how cutting processing of the workpiece 11 is carried out. As shown in FIG. 7, the cutting apparatus 12 according to the present embodiment includes two cutting units (cutting means, processing units, processing means, functional units, functional means) 70a and 70b. When cutting processing of the workpiece 11 is carried out, indexing feeding of the respective cutting units 70a and 70b is carried out in such a manner that the cutting units 70a and 70b do not interfere with each other. Specifically, for example, cutting processing of the workpiece 11 is carried out by one cutting unit 70a in order of planned dividing lines (streets) L1, L2, L3, L4, L5, L6, and L7. Simultaneously, cutting processing of the workpiece 11 is carried out by the other cutting unit 70b in order of planned dividing lines (streets) L14, L13, L12, L8, L9, L10, and L11. However, the order of the cutting processing can be arbitrarily changed in a range in which the cutting units 70a and 70b do not interfere with each other. In the cutting apparatus 12 according to the present embodiment, in the cutting processing carried out in such a procedure, the current of the rotational drive source joined to the spindle 76 can be detected by the current detecting unit. Information on the current included in a signal output from the current detecting unit is accumulated as data in the first storing section 8a in the storing section 8 via the communication section 10 and the control section 6 for example.

Figure 8A:
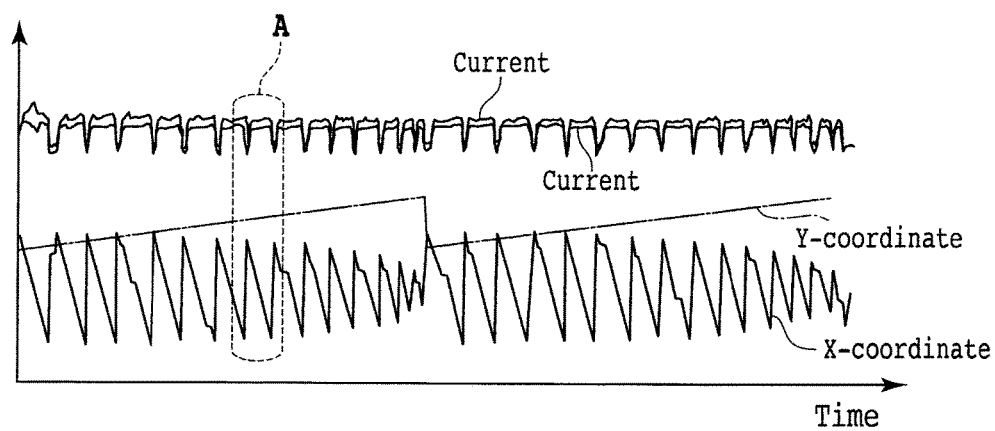
FIG. 8A is a graph showing time change of a current detected by a current detecting unit.
Figure 8B:
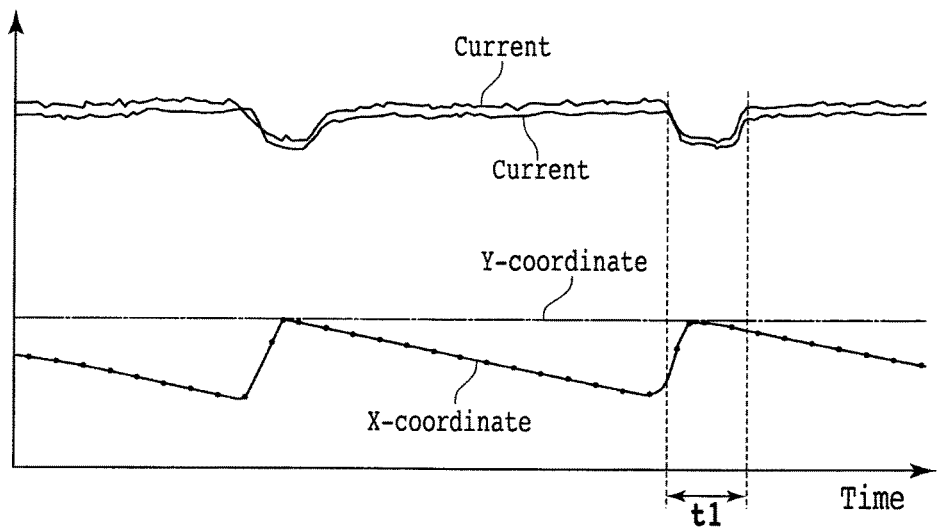
FIG. 8B is a graph obtained by enlarging part of FIG. 8A.

FIG. 8A is a graph showing time change of the current detected by the current detecting unit and FIG. 8B is a graph obtained by enlarging area A in FIG. 8A. When the current of the rotational drive source is detected by the current detecting unit, it is preferable to simultaneously measure the position (coordinates in the XY-plane parallel to the X-axis direction and the Y-axis direction) of the processing point by the position measuring unit 22. This allows information on this current to be accumulated in the first storing section 8a as data corresponding to the measurement result of the position measuring unit 22 and the time as shown in FIG. 8A and FIG. 8B. When the information on the current is accumulated as data, the information may be accumulated in the first storing section 8a after removing a period unnecessary as the information (for example, period t1 during which cutting processing is not carried out, shown in FIG. 8B).

Thereafter, the control section 6 compares the data accumulated in the first storing section 8a and a condition (threshold indicating a proper range, and so forth) stored in the storing section 8 in advance. Alternatively, the control section 6 compares the data accumulated in the first storing section 8a and normal data stored in the second storing section 8b in advance. The condition to be stored in the storing section 8 can be decided by checking the information included in signals output from the respective detecting units 20 (detection information) and the information relating to the quality obtained by the quality measuring apparatus 26 (quality information) against each other and carrying out analysis as described above. As a result of the comparison, if the data accumulated in the first storing section 8a deviates from the proper range or if the data does not correspond with the normal data, or the like, the control section 6 determines that there is a problem such as processing failure or apparatus failure and executes the processing or instruction necessary for prevention and solution of this problem. The value of the current flowing through the rotational drive source joined to the spindle 76 has a correlation with a problem such as chipping of the workpiece 11 or clogging of the cutting blade 94. Therefore, the control section 6 executes processing or instruction of stop of cutting processing, dressing of the cutting blade 94, or the like according to the comparison result and the determination result.

Figure 9A:
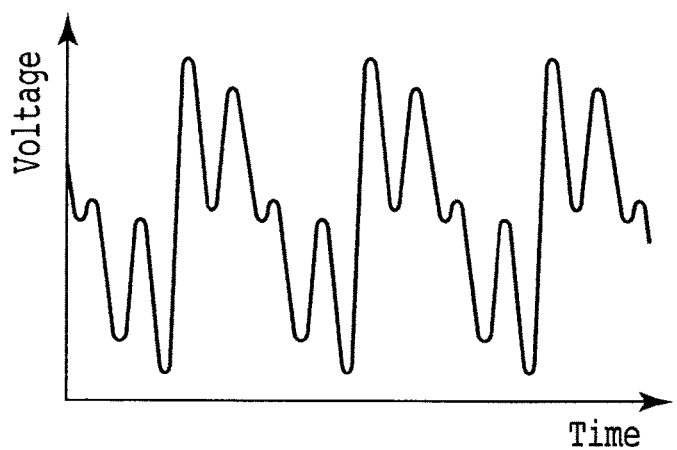
FIG. 9A is a graph showing an example of a signal (time change of the voltage) output from a vibration detecting unit.
Figure 9B:
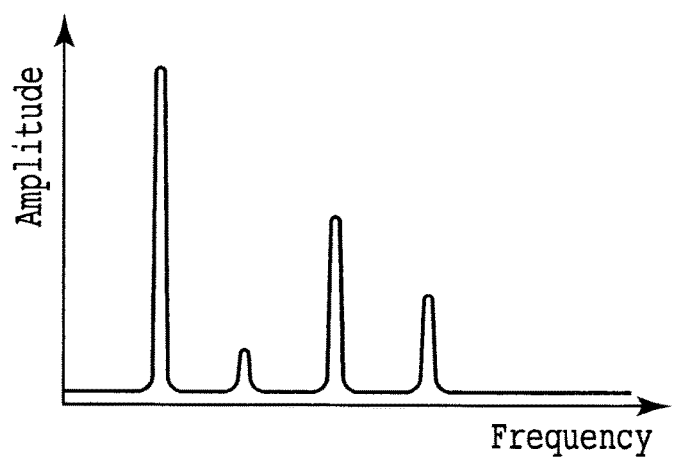
FIG. 9B is a graph showing an example of a signal after a Fourier transform.

Furthermore, in the cutting apparatus 12 according to the present embodiment, it is also possible to detect vibration of the cutting blade 94 and so forth by the vibration detecting unit 102 in this cutting processing. FIG. 9A is a graph showing an example of a signal (time change of the voltage) output from the vibration detecting unit 102 and FIG. 9B is a graph showing an example of a signal after a Fourier transform. In FIG. 9A, the ordinate axis indicates the voltage and the abscissa axis indicates the time. In FIG. 9B, the ordinate axis indicates the amplitude and the abscissa axis indicates the frequency. By performing a Fourier transform on the signal (time change of the voltage) output from the vibration detecting unit 102 as above, the vibration of the cutting blade 94 can be analyzed after being divided into major frequency components as shown in FIG. 9B. The information possessed by the signal after the Fourier transform (information relating to the frequency components of the vibration when the cutting processing of the workpiece 11 is carried out) is accumulated in the first storing section 8a as data. However, it is also possible to accumulate the information possessed by the signal output from the vibration detecting unit 102 as data as it is (without a Fourier transform). Also in the case of detecting the vibration of the cutting blade 94 by the vibration detecting unit 102, it is preferable to simultaneously measure the position (coordinates in the XY-plane parallel to the X-axis direction and the Y-axis direction) of the processing point by the position measuring unit 22. This allows information on the vibration of the cutting blade 94 to be accumulated in the first storing section 8a as data corresponding to the measurement result of the position measuring unit 22 and the time.

Figure 10:
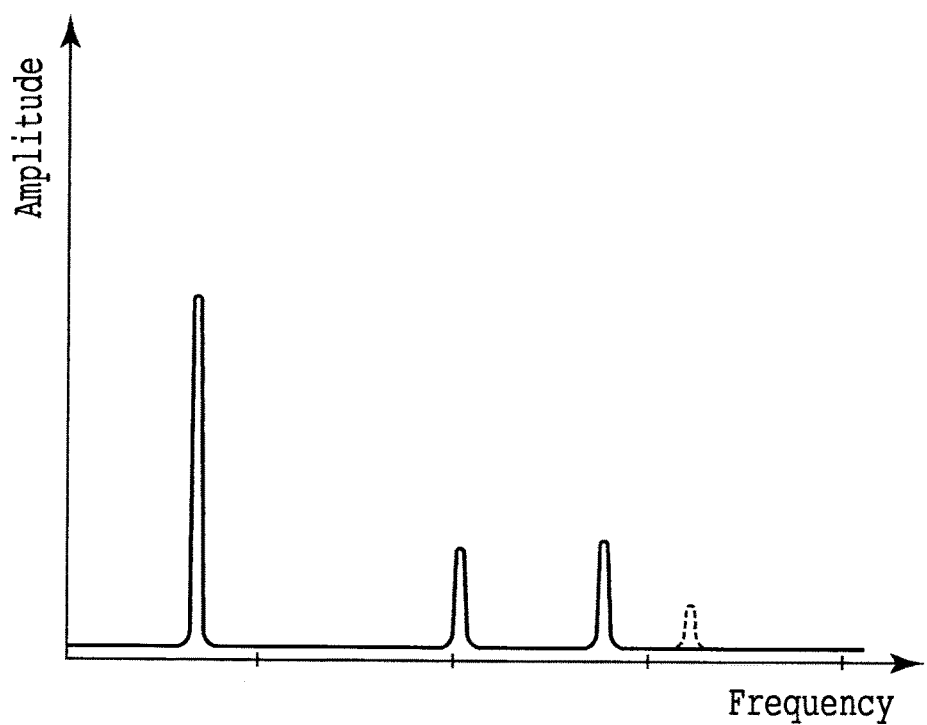
FIG. 10 is a graph showing an example of frequency components at the time of proper processing and frequency components at the time of improper processing.

In the second storing section 8b, information relating to frequency components of vibration when cutting processing of the workpiece 11 is carried out by the proper cutting blade 94 (at the time of proper processing) is stored as normal data in advance. The control section 6 compares this normal data with the data accumulated in the first storing section 8a. FIG. 10 is a graph showing an example of frequency components at the time of proper processing and frequency components at the time of improper processing. In FIG. 10, the ordinate axis indicates the amplitude and the abscissa axis indicates the frequency. Furthermore, in FIG. 10, the frequency components at the time of proper processing are shown by a solid line and the frequency components at the time of improper processing are shown by a dashed line. As shown in FIG. 10, at the time of improper processing, a vibration mode (frequency component) on the high-frequency side that is not found at the time of proper processing exists. If the data accumulated in the first storing section 8a does not correspond with the normal data stored in the second storing section 8b in advance in this manner, the control section 6 determines that there is a problem such as processing failure or apparatus failure and executes the processing or instruction necessary for prevention and solution of this problem. The frequency of vibration of the cutting blade 94 has a correlation with problems such as chipping of the workpiece 11, mounting of the erroneous cutting blade (mounting of the improper cutting blade 94), and chipping, clogging, wear, and so forth of the cutting blade 94. Therefore, the control section 6 executes processing or instruction of stop of cutting processing, dressing of the cutting blade 94, replacement of the cutting blade 94, or the like according to the comparison result and the determination result.

Figure 11:
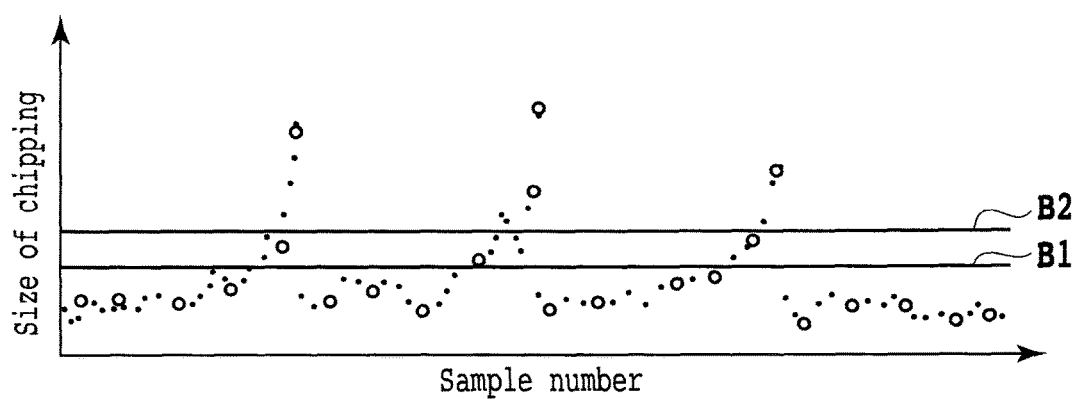
FIG. 11 is a graph showing the relationship between the size of chipping of workpieces estimated from vibration of a cutting blade and the size of actual chipping.

FIG. 11 is a graph showing the relationship between the size of chipping of the workpieces 11 estimated from vibration of the cutting blade 94 and the size of actual chipping. In FIG. 11, the ordinate axis indicates the size of chipping and the abscissa axis indicates the sample number. In addition, white circle marks indicate the estimated chipping and black circle marks indicate the actual chipping. From FIG. 11, it turns out that the size of the actual chipping can be properly estimated on the basis of vibration of the cutting blade 94. If the size of the estimated chipping surpasses a first threshold B1, the control section 6 determines that there is a problem such as processing failure or apparatus failure and executes processing or instruction of change in the processing condition, dressing of the cutting blade 94, precutting, or the like. A second threshold B2 is the maximum value of the allowable size of chipping.

It is also possible to cause the position (position in the Z-axis direction) of the cut-in origin of the cutting blade 94 to be automatically recognized by utilizing this vibration detecting unit 102. In this case, while the cutting blade 94 is rotated at high speed, the cutting blade 94 is gradually lowered to be brought into contact with the circumferential part of the chuck table 46. Then, vibration at the time of the contact is detected by the vibration detecting unit 102 and simultaneously the height (position in the Z-axis direction) of the cutting blade 94 (cutting unit 70) is measured by the height measuring unit 24. Information on the vibration detected by the vibration detecting unit 102 is accumulated in the first storing section 8a as contact data corresponding to the height measured by the height measuring unit 24. On the basis of this contact data, the control section 6 determines that the height of the cutting blade 94 (cutting unit 70) when the cutting blade 94 gets contact with the circumferential part of the chuck table 46 is the position of the cut-in origin of the cutting blade 94. The position of the cut-in origin recognized in this manner is used at the time of cutting processing of the workpiece 11 and so forth.

In Table 1, examples of state, phenomenon, and so forth that can be detected by the vibration detecting unit 102 are shown.

TABLE 1

| State and so forth that can be detected | Notes |
|---|---|
| Processing failure | Information is managed about each workpiece and each processing condition. Warning is made if a specific frequency surpasses a threshold. |
| Completion of precutting | The completion is notified if a specific frequency falls below a threshold. |
| Position of cut-in origin | The position can be determined even with a cutting blade having no electrical conductivity. |

TABLE 1-continued

| State and so forth that can be detected | Notes |
|---|---|
| Cut-in depth of cutting blade | The cut-in depth is determined on the basis of change in the signal waveform. |
| Uneven wear of cutting blade | The uneven wear is determined on the basis of change in the signal waveform. |
| Determination of acceleration/ deceleration of X-axis movement table | Whether or not the cutting blade has passed through an end part of the workpiece is determined from change in the signal waveform. If the cutting blade has passed through an end part, the speed of the X-axis movement table is increased (accelerated) or decreased (decelerated). |
| Frequency of kerf check | The frequency of the check of the cut edge (kerf) is changed according to the signal waveform. If normal data continues, processing of decreasing the frequency of the check or the like is executed for example. |
| Processing and modification of contact surface of flange member | The accuracy of processing and modification is determined on the basis of change in the signal waveform when the contact surface is polished to modify the shape. |
| Erroneous mounting of cutting blade | The erroneous mounting is determined on the basis of whether or not the signal waveform when the spindle is rotated after the cutting blade is mounted corresponds with the signal waveform of the proper cutting blade. |

As described above, the processing system 2 according to the present embodiment includes the detecting units (detecting means) 20 that are provided for the functional elements (functional units, functional means) such as the chuck table (holding unit, holding means) 46, the cutting unit (processing unit, processing means) 70, and the X-axis movement mechanism (feed unit, feed means) 34 and detects vibration, current, load, and so forth necessary for determining the states of the functional elements and so forth, and the first storing section (data accumulating unit, data accumulating means) 8a that accumulates information included in signals output from the detecting units 20 as data. This can prevent the occurrence of problems such as processing failure and apparatus failure and also respond to the occurrence of a sudden problem by utilizing the accumulated data.

Furthermore, the processing system 2 according to the present embodiment includes the position measuring unit (XY-position detecting unit, XY-position detecting means) 22 that detects the position of the chuck table 46 or the cutting unit 70 in the XY-plane parallel to the holding surface 46a of the chuck table 46. Thus, the information included in signals output from the detecting units 20 can be accumulated as data corresponding to the position measured by the position measuring unit 22. This makes it easier to identify the position at which a problem such as processing failure occurs.

The present invention is not limited to the description of the above embodiment and can be carried out with various changes. For example, in the above embodiment, the case of carrying out cutting processing of the workpiece 11 by the cutting apparatus 12 is described as one example of the use method of the processing system 2. However, also with processing apparatuses such as the laser processing apparatus 14, the grinding apparatus 16, and the tape sticking apparatus 18, it is possible to prepare for problems by utilizing various detecting units (detecting means).

Furthermore, there is no limit to the detecting units used in the respective processing apparatuses and an arbitrary detecting unit can be added or omitted. Examples of the detecting unit that can be used in a processing apparatus and the major detection targets are shown in Table 2.

TABLE 2

| Detecting unit | Detection target |
| --- | --- |
| Vibration detecting unit | Vibration of chuck table<br>Vibration of cutting unit<br>Vibration of grinding unit |
| Voltage detecting unit | Voltage applied to cutting liquid (measurement of specific resistance)<br>Voltage applied to grinding liquid (measurement of specific resistance)<br>Output voltage of contactless setup apparatus used for setup of cutting blade |
| Current detecting unit | Current of rotational drive source (motor) joined to spindle<br>Current flowing through cutting liquid (measurement of specific resistance)<br>Current flowing through grinding liquid (measurement of specific resistance) |
| Load measuring unit | Load applied from grinding unit to workpiece |
| Speed detecting unit | Speed of table |
| Torque detecting unit | Torque of X-axis pulse motor<br>Torque of rotational drive source (motor) joined to chuck table<br>Torque of rotational drive source (motor) joined to spinner table |
| Rotation amount detecting unit | Rotation angle of rotational drive source (motor) joined to chuck table<br>Rotational speed of rotational drive source (motor) joined to spindle<br>Rotational speed of rotational drive source (motor) joined to spinner table |
| Pressure detecting unit | Pressure of air supplied to spindle<br>Pressure (negative pressure) when workpiece is held by chuck table<br>Pressure (negative pressure) when chuck table is fixed to table base<br>Pressure (negative pressure) when workpiece is held by spinner table<br>Pressure of cutting liquid<br>Pressure of fluid for cleaning (two fluids)<br>Pressure of air for drying spinner table<br>Pressure of main air<br>Pressure of clean air |
| Temperature detecting unit | Temperature of cooling water for spindle<br>Temperature of air supplied to spindle<br>Temperature of cutting liquid<br>Temperature of grinding liquid<br>Temperature of outside of processing apparatus (room temperature)<br>Temperature of table base<br>Temperature of X-axis pulse motor, Y-axis pulse motor, and Z-axis pulse motor<br>Temperature of X-axis ball screw, Y-axis ball screw, and Z-axis ball screw<br>Temperature of base, support structure, and spindle housing<br>Temperature of contactless setup apparatus used for setup of cutting blade |
| Flow rate detecting unit | Flow rate of cutting liquid<br>Flow rate of grinding liquid |
| Thickness detecting unit | Thickness of workpiece |

TABLE 2-continued

| Detecting unit | Detection target |
| --- | --- |
| Illuminance detecting unit | Illuminance of various kinds of light sources |
| Timer | Time taken for various kinds of processing and so forth |

Examples of state, phenomenon, and so forth that can be detected by the respective detecting units are shown in Table 3.

TABLE 3

| State and so forth that can be detected | Detecting unit | Notes |
| --- | --- | --- |
| Abnormality of nozzle for supplying cutting liquid and so forth | Pressure detecting unit<br>Current detecting unit | The pressure of the cutting liquid and the current of the rotational drive source (motor) joined to the spindle are constantly monitored. Abnormality is determined in the state in which the workpiece is not being processed. For example, the deviation of the position of the nozzle and clogging of the nozzle can be inferred by determining whether or not a proper amount of cutting liquid is supplied to the cutting blade. |
| Deterioration of ejector | Pressure detecting unit | Change in the pressure when the workpiece is held by the chuck table is monitored. It is determined that the ejector involves deterioration if the time taken for the lowering of the pressure is long. |
| Clogging of pores of chuck table | Pressure detecting unit | Change in the pressure when the workpiece is held by the chuck table is monitored. It is determined that pores are clogged with a foreign substance if the time taken for the lowering of the pressure is short. |
| Deterioration of X-axis ball screw or the like | Timer<br>Speed detecting unit | The movement speed of the X-axis movement table or the like, the time, and so forth are monitored. It is determined that the X-axis ball screw or the like involves deterioration if the movement speed is slow and a long time is taken for the movement. |
| Deterioration of air cylinder or the like | Timer | The time taken for expansion and contraction of the air cylinder, and so forth, are monitored. Notification of maintenance or the like is made if a long time is taken. |
| Completion of idling (warm-up) | Temperature detecting unit | The temperature of a part having an influence on the accuracy of processing is monitored. Notification is made when the temperature falls within a predetermined range. |
| Maintenance of contactless setup apparatus | Voltage detecting unit | The output voltage of contactless setup apparatus used for setup of the cutting blade is monitored. Notification of maintenance of a light receiving part or the like is made if the output voltage falls below a threshold. |
| Illuminance correction of light source for camera and so forth | Illuminance detecting unit | Notification is made if the illuminance falls below a threshold. |

TABLE 3-continued

| State and so forth that can be detected | Detecting unit | Notes |
|---|---|---|
| Wear of O-ring | Pressure detecting unit | The pressure when the workpiece is held by the spinner table is monitored. If the time taken for the lowering of the pressure is long, notification is made because possibly an O-ring involves wear. |

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing system comprising:
a processing apparatus having functional units including a holding unit that holds a workpiece by a holding surface, a processing unit that processes the workpiece held by the holding unit, and a feed unit that moves the holding unit and the processing unit relatively;
a detecting unit that is provided for part or all of the functional units and detects any of vibration, current, voltage, load, speed, torque, pressure, temperature, flow rate, change in a taken image, and thickness of the workpiece; and
a data accumulating unit that accumulates information included in a signal output from the detecting unit as accumulated data,
the processing apparatus further comprising,
a determining unit that determines states of the functional units on the basis of the accumulated data in the data accumulating unit, and
a normal data storing unit that stores information included in a signal output from the detecting unit when the functional units are normal based on a predetermined condition as normal data;
the determining unit comparing the accumulated data in the data accumulating unit and the normal data stored in the normal data storing unit and determining the states of the functional units,
wherein the processing apparatus is a cutting apparatus including, as the processing unit, a cutting unit in which a cutting blade that carries out cutting processing of the workpiece held by the holding unit is mounted,
the cutting apparatus includes a vibration detecting unit that detects vibration of the cutting blade as the detecting unit,
information on vibration when cutting processing of the workpiece is carried out by the cutting blade is accumulated in the data accumulating unit as the accumulated data,
information on vibration when cutting processing of the workpiece is carried out by a proper cutting blade corresponding to the workpiece is stored in the normal data storing unit as the normal data, and
the determining unit compares the accumulated data in the data accumulating unit and the normal data stored in the normal data storing unit and determines whether or not cutting processing of the workpiece is normally carried out.

2. The processing system according to claim 1, wherein the accumulated data in the data accumulating unit is used for any of quality control of the workpiece, management of the functional units, management of continuous operation, investigation of cause of a breakdown, and examination of an operation error.

3. The processing system according to claim 1, further comprising:
a measuring unit that measures quality of the workpiece processed by the processing apparatus.

4. The processing system according to claim 1, further comprising:
an XY-position detecting unit that detects a position of the holding unit or the processing unit in an XY-plane parallel to the holding surface;
the data accumulating unit associating information included in a signal output from the detecting unit with the position detected by the XY-position detecting unit and accumulating the information as the accumulated data.

5. The processing system according to claim 1, further comprising:
a data output unit that outputs the accumulated data in the data accumulating unit.

6. The processing system according to claim 1, wherein the determining unit compares the accumulated data in the data accumulating unit and the normal data stored in the normal data storing unit and determines whether or not the cutting blade mounted in the cutting unit is proper.

7. The processing system according to claim 1, wherein the determining unit compares the accumulated data in the data accumulating unit and the normal data stored in the normal data storing unit and determines any of chipping, a degree of wear, and occurrence of clogging regarding the cutting blade mounted in the cutting unit.

8. The processing system according to claim 1, further comprising:
a Z-position detecting unit that detects a position of the cutting unit in a Z-axis direction perpendicular to the holding surface;
the vibration detecting unit outputting a signal corresponding to vibration when the cutting blade mounted in the cutting unit moves in the Z-axis direction and gets contact with a circumferential part of the holding unit;
the data accumulating unit associating information on the vibration when the cutting blade gets contact with the circumferential part with the position in the Z-axis direction detected by the Z-position detecting unit and accumulating the information as contact data; and
the determining unit determining that a position in the Z-axis direction when the cutting blade gets contact with the circumferential part is a position of a cut-in origin of the cutting blade on the basis of the contact data.

* * * * *